US007245112B2

(12) United States Patent
Velhner et al.

(10) Patent No.: US 7,245,112 B2
(45) Date of Patent: Jul. 17, 2007

(54) ENERGY DISCHARGE APPARATUS

(75) Inventors: Aleks Velhner, Richmond (CA); Neil Garfield Allyn, Vancouver (CA); Terry Moreau, West Vancouver (CA)

(73) Assignee: Teleflex Canada Incorporated, Richmond (CA)

( * ) Notice: Subject to any disclaimer, the term of this patent is extended or adjusted under 35 U.S.C. 154(b) by 180 days.

(21) Appl. No.: 11/363,261

(22) Filed: Feb. 28, 2006

(65) Prior Publication Data
US 2006/0181251 A1 Aug. 17, 2006

Related U.S. Application Data

(63) Continuation of application No. 11/059,544, filed on Feb. 17, 2005.

(51) Int. Cl.
*H20P 9/01* (2006.01)
(52) U.S. Cl. .............................. 322/59; 322/75; 322/89; 322/95
(58) Field of Classification Search ................. 322/59, 322/75, 89, 95
See application file for complete search history.

(56) References Cited

U.S. PATENT DOCUMENTS

| 3,605,005 | A | | 9/1971 | Nagae et al. |
| 3,605,006 | A | * | 9/1971 | Nagae et al. ................. 322/24 |
| 3,619,761 | A | | 11/1971 | Nagae et al. |
| 4,591,775 | A | | 5/1986 | Nussel et al. |
| 4,723,106 | A | | 2/1988 | Gibbs et al. |
| 5,023,539 | A | | 6/1991 | Miller et al. |
| 5,077,485 | A | | 12/1991 | Rashid |
| 5,077,761 | A | * | 12/1991 | Tokunaga ................... 375/371 |
| 5,345,125 | A | | 9/1994 | Raad |
| 6,191,562 | B1 | | 2/2001 | Mueller et al. |
| 6,891,706 | B2 | * | 5/2005 | Leonov ....................... 361/20 |

* cited by examiner

*Primary Examiner*—Darren Schuberg
*Assistant Examiner*—Iraj A. Mohandesi
(74) *Attorney, Agent, or Firm*—Norman M Cameron

(57) ABSTRACT

There is provided an energy discharge apparatus for dissipating a quantity of stored magnetic energy in a generator field coil of a brushless generator. The apparatus includes an exciter regulator responsive to an output signal of the generator and which provides an exciter field signal, and an exciter field coil responsive to the exciter field signal and which provides an exciter magnetic field, and an exciter armature coil responsive to the exciter magnetic field and which provides an exciter armature signal. The apparatus further includes a control circuit responsive to the exciter armature signal, and a variable impedance in series with the generator field coil and responsive to the control circuit. The variable impedance serves to dissipate the quantity of stored magnetic energy. In another embodiment the apparatus includes a positive feedback circuit responsive to the exciter armature signal and operable to dissipate the quantity of stored magnetic energy. The positive feedback circuit is further responsive to the dissipation of the quantity of stored magnetic energy such that a rate of dissipation increases until the quantity of stored magnetic energy substantially reduces to an ineffective amount.

16 Claims, 4 Drawing Sheets

ENERGY DISCHARGE APPARATUS

This is a continuation application of U.S. patent application Ser. No. 11/059,544, filed Feb. 17, 2005.

BACKGROUND OF THE INVENTION

1. Field of the Invention

The present invention relates to an energy discharge apparatus for a coil in an electric machine, and in particular in a brushless generator. The energy discharge apparatus is used to dissipate a quantity of stored magnetic energy in the coil.

2. Description of the Related Art

It is well known in the art that generator load-dump response time is often dominated by the field winding decay time of the quantity of stored magnetic energy. The prior art has made use of various schemes in brushed generators to speed the decay of the quantity of the stored magnetic energy in a field winding.

For instance, U.S. Pat. No. 6,191,562 by Mueller et al. makes use of a circuit configuration in a claw-pole generator having a field winding and a generator winding. The circuit configuration is for the degradation of the stored magnetic energy of a main field winding. The circuit configuration includes a power switch, a clock control and a zener diode. The circuit configuration is incorporated with other electronics for control of the field winding. In a brushless generator environment the use of direct electrical connections to the main field winding is not available however.

U.S. Pat. No. 5,023,539 by Miller et al. provides a method and apparatus for controlling field current in an alternator. The apparatus includes a regulator, a first insulated gate transistor controlled by a first optocoupler and a first operational amplifier, a second insulated gate transistor controlled by a second optocoupler and a second operational amplifier. The first transistor is in series with the field winding and provides a pulse width modulated signal to the field winding. The second transistor is in parallel with the field winding and serves to auto-commute the current through the field winding to maintain a desired regulated battery voltage. This apparatus has the disadvantage of complexity in a brushless generator application. For reliability it is undesirable to incorporate complex electronics on a rotor of the brushless generator. Furthermore, as stated above, direct electrical connections to the main field winding are not available between a stator and the rotor. Furthermore, a rate of decay of the energy in the field winding is limited by an RL network.

In a brushless generator application the rate of decay of energy in the field winding is usually limited largely by the RL network formed by the winding itself and the total resistance of the current path.

What is needed is a novel apparatus for a rapid degradation of the quantity of stored magnetic energy and which can be directly connected to the field winding of a brushless generator.

BRIEF SUMMARY OF THE INVENTION

The present invention relates to an energy discharge apparatus for dissipating a quantity of stored magnetic energy in a generator field coil of a brushless generator. The apparatus includes an exciter regulator responsive to an output signal of the generator and providing an exciter field signal, and an exciter field coil responsive to the exciter field signal and providing an exciter magnetic field, and an exciter armature coil responsive to the exciter magnetic field and providing an exciter armature signal. The apparatus further includes a control circuit responsive to the exciter armature signal, and a variable impedance in series with the generator field coil and responsive to the control circuit. The variable impedance serves to dissipate the quantity of stored magnetic energy.

In another embodiment the apparatus includes a positive feedback circuit responsive to the exciter armature signal and operable to dissipate the quantity of stored magnetic energy. The positive feedback circuit is further responsive to the dissipation of the quantity of stored magnetic energy such that a rate of dissipation increases until the quantity of stored magnetic energy substantially reduces to an insubstantial amount.

In a further embodiment of the present invention, there is provided an energy discharge apparatus for increasing a rate of dissipation of a quantity of stored magnetic energy in a coil, the coil having a voltage and a current signal. The apparatus includes a variable impedance in series with the coil and a first control circuit responsive to a substantial decrease in the voltage signal and serves to increase the variable impedance. The increase in the variable impedance causes a decrease in the current signal. The decrease in the current signal causes a back EMF in the coil that is applied across the variable impedance and serves to counteract the decrease in the current signal. The back EMF and the variable impedance together serve to dissipate the quantity of stored magnetic energy. The apparatus further includes a second control circuit responsive to the back EMF and serves to further increase the variable impedance which causes an increase in the rate of dissipation of the quantity of stored magnetic energy.

In a further embodiment of the invention there is provided an energy discharge apparatus for dissipating a quantity of stored magnetic energy in a coil. The apparatus includes a variable impedance device having a first device terminal, a second device terminal and a third device terminal. The variable impedance device is in series with the coil with the second device terminal being connected to a first coil terminal. A first voltage signal is between a second coil terminal and the third device terminal. A second voltage signal is between the second and the third device terminals. A third voltage signal is between the first and the third device terminals. The apparatus further includes a first control means for adjusting the variable impedance device. The first control means is connected to the first device terminal, the third device terminal and the second coil terminal. The first control means is responsive to the first voltage signal and is operable to adjust the third voltage signal. The third voltage signal is operable to adjust an impedance between the second and the third device terminals. The apparatus further includes a second control means for rapidly adjusting the variable impedance device. The second control means is connected between the first device terminal, the second device terminal and the third device terminal. The second control means is responsive to the second voltage signal and is operable to decrease the third voltage signal, thereby increasing the impedance.

BRIEF DESCRIPTION OF THE DRAWINGS

The present invention will be more readily understood from the following description of preferred embodiments thereof given, by way of example, with reference to the accompanying drawings, in which.

DESCRIPTION OF THE PREFERRED EMBODIMENTS

Figure 1:
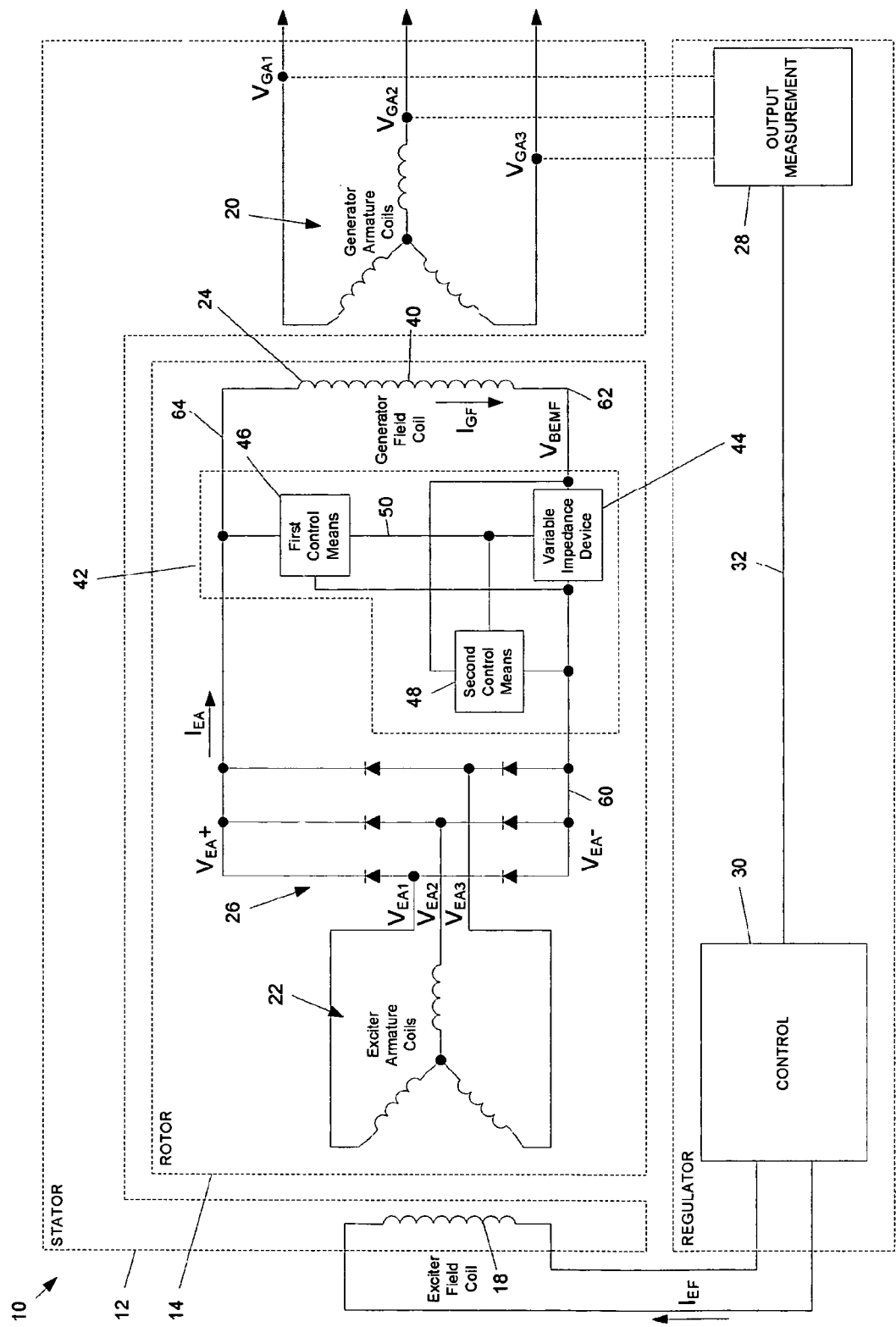
FIG. 1 is a block diagram of an energy discharge apparatus in a brushless generator according to an embodiment of the invention.

The operation and structure of a preferred embodiment of the present invention can be understood by referring to FIG. 1. A brushless generator indicated generally by reference numeral 10 comprises a stator 12, a rotor 14 and a regulator 16. The stator 12 is stationary and includes an exciter field coil 18 and a generator armature coil assembly indicated generally by reference numeral 20. The rotor 14 is rotated by an external mechanical force and includes an exciter armature coil assembly indicated generally by reference numeral 22 and a generator field coil 24.

In operation, the exciter field coil 18 is excited by an exciter field current $I_{EF}$ from the regulator 16 producing an exciter magnetic field. The exciter armature coil assembly 22 rotates through the exciter magnetic field and consequently a 3-phase exciter armature voltage $V_{EA1}$, $V_{EA2}$ and $V_{EA3}$ is induced in the assembly. The induced 3-phase exciter armature voltage $V_{EA1}$, $V_{EA2}$ and $V_{EA3}$ is rectified by a bridge rectifier assembly indicated generally by reference numeral 26 which provides a DC exciter armature voltage $V_{EA}$ and a DC exciter armature current $I_{EA}$.

The generator field coil 24 is excited by the DC exciter armature current $I_{EA}$ producing a generator field magnetic field. Since the generator field coil 24 is on the rotor 14 which rotates, the generator field magnetic field modulates in time and space. The generator armature coil assembly 20 consequently has an induced 3-phase generator armature voltage $V_{GA1}$, $V_{GA2}$ and $V_{GA3}$.

The regulator 16 has an output measurement unit 28, such as an operational amplifier and pulse width modulated optocoupler, and a control unit 30, such as a PID controller. The output measurement unit 28 provides an output sample signal 32, representative of the 3-phase generator armature voltage $V_{GA1}$, $V_{GA2}$ and $V_{GA3}$, or a generator armature current in other embodiments, to the control unit 30. The control unit 30 is responsive to the output sample signal 32 and serves to adjust the exciter field current $I_{EF}$ so as to maintain the 3-phase generator armature voltage $V_{GA1}$, $V_{GA2}$ and $V_{GA3}$ at a set-point value.

In normal operation, the 3-phase generator armature voltage $V_{GA1}$, $V_{GA2}$ and $V_{GA3}$ is applied to a load. To maintain the 3-phase generator armature voltage $V_{GA1}$, $V_{GA2}$ and $V_{GA3}$ at the set-point value for the given load, the DC exciter armature current $I_{EA}$ has a given load value. As stated above, the DC exciter armature current $I_{EA}$ flows through the generator field coil 24 and for the given load value establishes a generator field flux that is related to a quantity of stored magnetic energy 40. The quantity of stored magnetic energy 40 is related to a coupling of energy between the generator field coil 24 and the generator armature assembly 20.

When the load is suddenly removed from the generator 10, the 3-phase generator armature voltage $V_{GA1}$, $V_{GA2}$ and $V_{GA3}$ tends to increase. The regulator 16 responds by reducing the exciter field current $I_{EF}$ which consequently reduces the exciter armature voltage $V_{EA}$.

Even though the exciter armature voltage $V_{EA}$ is reduced in response to the removal of the load, the generator field coil 24 still has the quantity of stored magnetic energy 40. As a result, in a transient response of the generator after a sudden removal of the load, even after reducing the exciter armature voltage $V_{EA}$, the 3-phase generator armature voltage $V_{GA1}$, $V_{GA2}$ and $V_{GA3}$ increases due to the quantity of stored magnetic energy 40.

To substantially reduce the amount the generator armature voltage $V_{GA1}$, $V_{GA2}$ and $V_{GA3}$ increases, an energy discharge apparatus 42 is used. The energy discharge apparatus 42 comprises a variable impedance device 44 having an impedance, a first control means 46 such as a passive RC network, and a second control means 48 such as an active transistor network.

The variable impedance device 44 is responsive to an impedance control signal 50 and provides the impedance between nodes 60 and 62. In normal operation, the impedance of the variable impedance device 44 is negligible. During the transient response caused by the sudden removal of the load, the variable impedance device 44 serves to dissipate the quantity of stored magnetic energy 40 in the generator field coil 24, as described further below.

The first control means 46 mentioned above is responsive to the exciter armature voltage $V_{EA}$ and provides the impedance control signal 50. During normal operation the first control means 46 detects the exciter armature voltage $V_{EA}$, which has a substantial value, and controls the variable impedance device 44 so the impedance is negligible. During the transient response the first control means 46 detects a substantial drop in the exciter armature voltage $V_{EA}$ and responds by adjusting the impedance control signal 50 so that the impedance device 44 increases the variable impedance.

When the impedance of the variable impedance device 44 increases in value, a generator field current $I_{GF}$ decreases in value. This produces a back EMF $V_{BEMF}$ at node 62 which serves to counteract the decreasing generator field current $I_{GF}$. The increased impedance of the variable impedance device 44 and the back EMF $V_{BEMF}$ act together to dissipate the quantity of stored magnetic energy 40.

The second control means 48 is responsive to the back EMF $V_{BEMF}$ at node 62 and acts to adjust the impedance control signal 50 such that the impedance of the variable impedance device 44 further increases. Accordingly, the generator field current $I_{GF}$ decreases and correspondingly the back EMF $V_{BEMF}$ again increases to counteract the decrease in the generator field current. Since both the impedance of the variable impedance device 44 and the back EMF $V_{BEMF}$ have increased, a rate of dissipation of the quantity of the stored magnetic energy has increased. Essentially, this is a positive feedback cycle that repeats itself until the quantity of stored magnetic energy has been reduced to an inconsequential amount.

The above embodiment has the advantage of being located directly on the rotor without requiring any direct electrical connections to the stator, and the advantage of yielding a rapid decay of the quantity of the stored magnetic energy.

Figure 2:
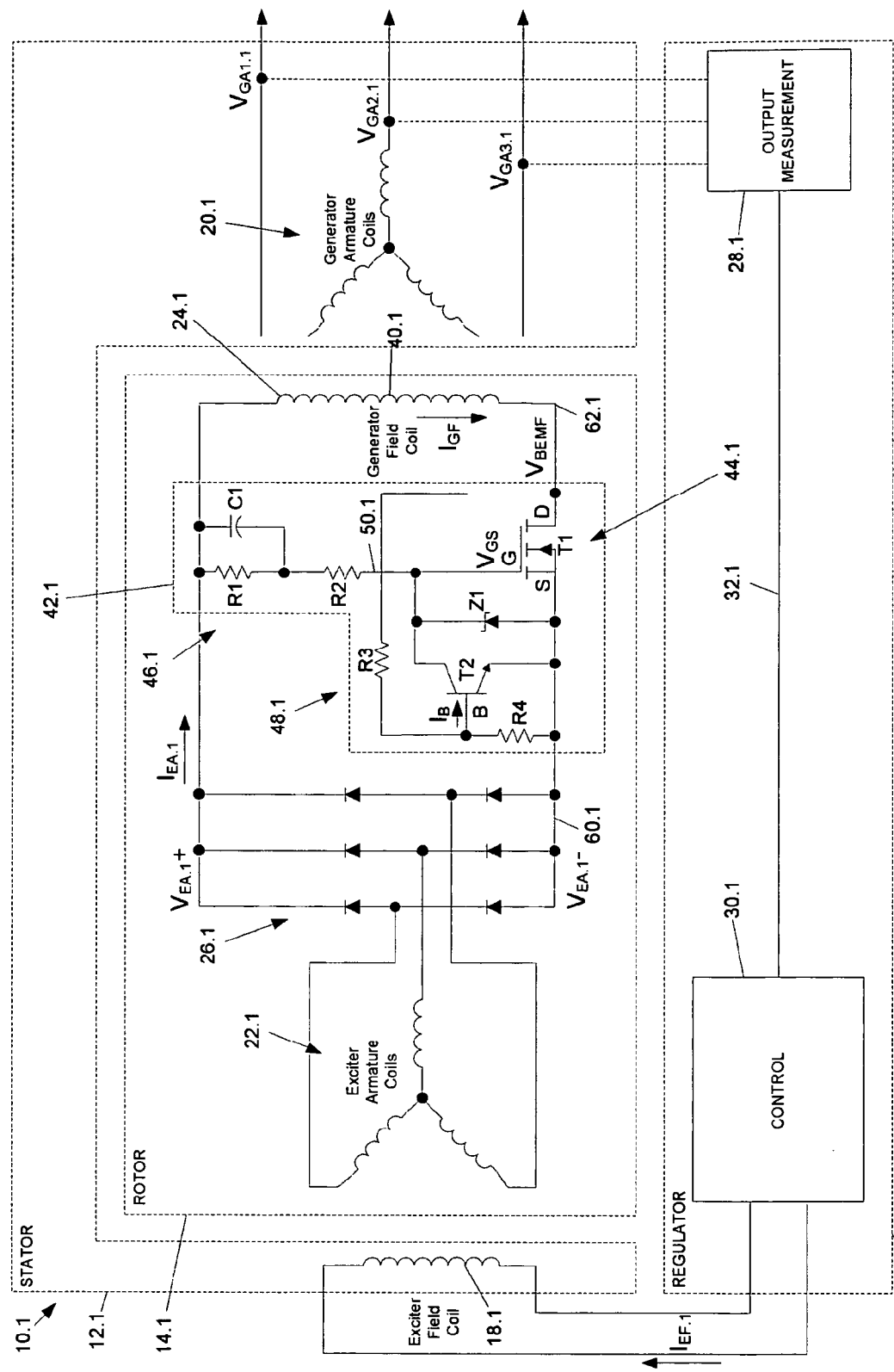
FIG. 2 is a schematic diagram of an energy discharge apparatus according to another embodiment of the invention.

FIG. 2 shows another embodiment of the invention wherein like parts have like reference numerals with the suffix "0.1" including details of the variable impedance device 44.1, first control means 42.1 and the second control means 48.1. The variable impedance device is indicated generally by reference numeral 44.1, in this example, and comprises an n-type MOSFET transistor T1 having a drain D, a source S and a gate G. The first control means is indicated generally by reference numeral 46.1 and comprises a resistor R1, a resistor R2, a capacitor C1 and a zener diode Z1. The second control means is indicated generally by reference numeral 48.1 and comprises a resistor R3, a resistor R4 and an NPN bipolar transistor T2.

During normal operation the transistor T1 has a voltage $V_{GS}$ between the gate G and the source S that is sufficient to turn it on. Accordingly, there is a negligible impedance between the drain D and the source S. The zener diode Z1 serves to limit the maximum voltage applied between the gate G and the source S. Transistor T2 is off during normal operation.

During the transient response the exciter armature voltage $V_{EA.1}$ drops sufficiently and accordingly the voltage $V_{GS}$ is reduced enough to begin to turn off the transistor T1. The impedance between the drain D and the source S increases. As discussed above, this reduces the generator field current $I_{GF}$ which creates a back EMF $V_{BEMF.1}$ that counteracts the decrease in the generator field current. The increased resistance between the drain D and source S and the back EMF $V_{BEMF.1}$ act together to dissipate the quantity of the stored magnetic energy.

The back EMF $V_{BEMF.1}$ is applied across transistor T1 between the drain D and source S, as well as across resistors R3 and R4. This creates a sufficient base current $I_B$ into a base B of transistor T2 and consequently turns on transistor T2. With transistor T2 on, a charge on the gate G of transistor T1 is depleted. Consequently, the voltage $V_{GS}$ further decreases between the gate G and the source S, which further increases the impedance between the drain D and the source S. Again, the generator field current $I_{GF}$ decreases, causing a further increase in the back EMF $V_{BEMF.1}$ and accordingly the rate of dissipation increases.

The above embodiment has both the advantages of being located on the rotor without having electrical connections to the stator and providing for a high rate of dissipation of the quantity of the stored magnetic energy. Furthermore, this embodiment has the advantage of simplicity and requires few electrical components for operation.

Figure 3:
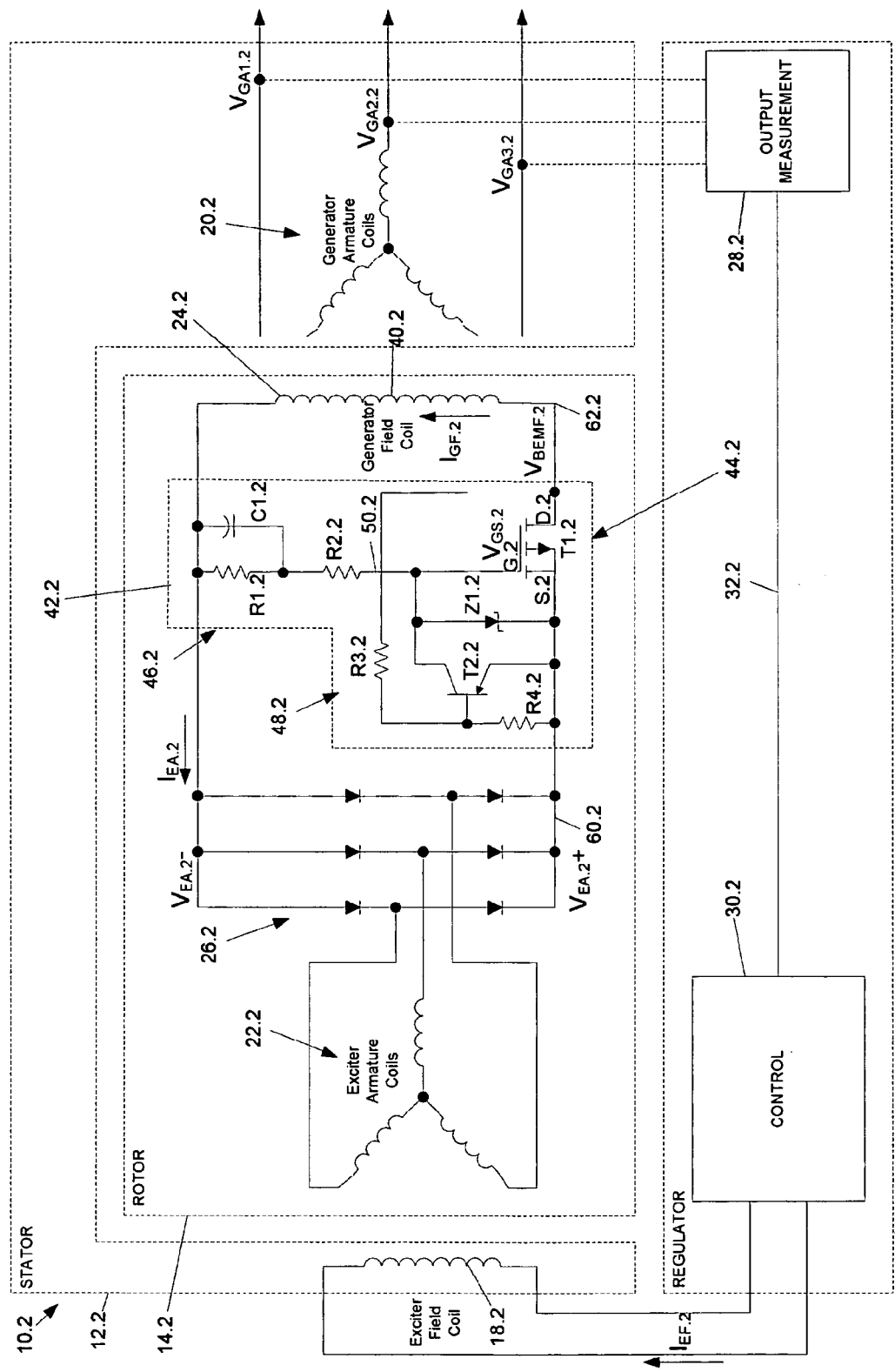
FIG. 3 is a schematic diagram of an energy discharge apparatus according to a further embodiment of the invention.

As will be apparent to those skilled in the art, a similar structure using p-type MOSFET and PNP bipolar transistors can be constructed. One such embodiment is shown in FIG. 3, wherein like parts have like reference designators with the suffix "0.2". Transistor T1.2 is a p-type MOSFET transistor. Transistor T2.2 is a PNP bipolar transistor. This embodiment operates in a similar fashion to the previous embodiment shown in FIG. 2. Notable differences are the variable impedance 44.2 operating on the high side of bridge rectifier assembly 26.1. Furthermore, the back EMF $V_{BEMF.2}$ is of opposite polarity to the back EMF $V_{EMF.1}$ in the embodiment of FIG. 2.

Again, it is apparent to those skilled in the art that similar structures can be constructed using either PNP or NPN bipolar transistors for the variable impedance device 44, and n-type or p-type MOSFET transistors for the transistor T2.

Referring back to FIG. 1, the first control means 46, also called a variable impedance control means, and the second control means 48, also called a dissipation accelerating means, can include elements operating in the digital domain. Conceptually, the first control means 46 and the second control means 48 can have separate digital control means. However, practically a common digital control means, indicated generally by reference numeral 80 in FIG. 4, would be utilized to serve both as the first and second control means.

Figure 4:
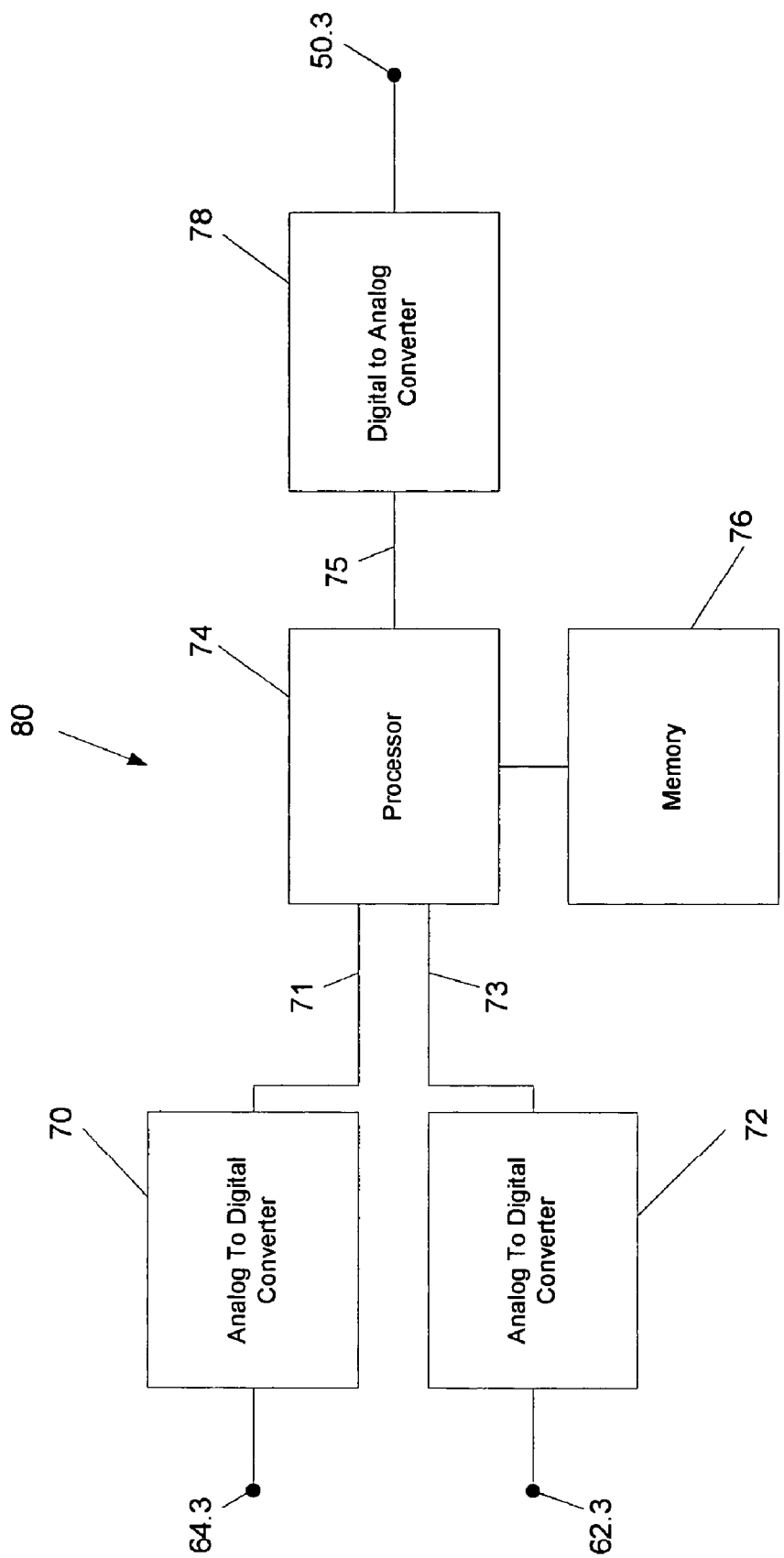
FIG. 4 is a block diagram of an embodiment of a first control means and a second control means of the embodiment of FIG. 1.

The block diagram of FIG. 4 shows an embodiment of the common digital control means 80 wherein like parts have like reference numerals with the suffix "0.3". This embodiment is not preferred over other embodiments employing passive and active electronic networks since it is more complex. FIG. 4 shows a pair of analog to digital converters 70 and 72 sampling the signals at nodes 64.3 and 62.2 respectively, and presenting a corresponding pair of digital signals 71 and 73 to a processor 74. The processor 74 is connected to a memory 76 and runs a control algorithm. The processor controls a variable impedance device similar to the variable impedance device 44, shown in FIG. 1, by providing a digital control signal 75 to a digital to analog converter 78 which provides the impedance control signal 50.3. Implementations details of such digital control circuits are commonly understood in the art and therefore will not be elaborated upon further.

As will be apparent to those skilled in the art, various modifications may be made within the scope of the appended claims.

What is claimed is:

1. An energy discharge apparatus for dissipating a quantity of stored magnetic energy in a generator field coil of a brushless generator, the brushless generator having an output signal, the apparatus comprising:
    an exciter regulator responsive to the output signal of the generator and providing an exciter field signal;
    an exciter field coil responsive to the exciter field signal and providing an exciter magnetic field;
    an exciter armature coil responsive to the exciter magnetic field and providing an exciter armature signal;
    a first control circuit responsive to the exciter armature signal;
    a variable impedance in series with the generator field coil and responsive to the first control circuit, the variable impedance, wherein the first control circuit includes a first resistor, a second resistor and a capacitor, the first resistor being connected in parallel with the capacitor and being connected in series with the second resistor, the first resistor and the capacitor being connected to the second coil terminal, the second resistor being connected to the first device terminal serving to dissipate the quantity of stored magnetic energy; and
    a second control circuit responsive to a back EMF generated by the generator field coil, serving to further increase the variable impedance.

2. The energy discharge apparatus as claimed in claim 1, wherein the variable impedance includes a transistor.

3. The energy discharge apparatus as claimed in claim 2, wherein the transistor is a MOSFET transistor having a gate, a drain and a source terminals, the gate terminal being the first device terminal, the drain terminal being the second device terminal and the source terminal being the third device terminal.

4. The energy discharge apparatus as claimed in claim 2, wherein the transistor is a bipolar transistor having a base, a collector and an emitter terminals, the base terminal being the first device terminal, the collector terminal being the second device terminal and the emitter terminal being the third device terminal.

5. The energy discharge apparatus as claimed in claim 1, wherein the first control circuit further includes a zener diode having an anode and a cathode, the anode being connected to the third device terminal and the cathode being connected to the first device terminal.

6. The energy discharge apparatus as claimed in claim 1, further including a positive feedback circuit responsive to the exciter armature signal and operable to dissipate the quantity of stored magnetic energy, the positive feedback circuit being further responsive to the dissipation of the quantity of stored magnetic energy such that a rate of dissipation increases until the quantity of stored magnetic energy substantially reduces to an insubstantial amount.

7. The energy discharge apparatus as claimed in claim 1, wherein the generator field coil has a voltage signal and a current signal, the first control circuit being responsive to a substantial decrease in the voltage signal and serving to increase the variable impedance, the increase in the variable impedance causing a decrease in the current signal, the decrease in the current signal causing the back EMF in the coil that is applied across the variable impedance and serving to counteract the decrease in the current signal, the back EMF and the variable impedance together serving to dissipate the quantity of stored magnetic energy, the second control circuit being responsive to the back EMF and serving to further increase the variable impedance causing an increase in a rate of dissipation of the quantity of stored magnetic energy.

8. The energy discharge apparatus as claimed in claim 1, further including a dissipation accelerating means for rapidly adjusting the variable impedance, the generator field coil having a voltage signal and a current signal, the first control circuit being responsive to the voltage signal, a substantial decrease in the voltage signal causing an increase in the variable impedance, the increase in the variable impedance causing a decrease in the current signal, the decrease in the current signal causing the back EMF in the coil, the back EMF in the coil being applied across the variable impedance and being operable to counteract the decrease in the current signal, the variable impedance and the back EMF serving to dissipate the quantity of stored magnetic energy at a rate of dissipation, the dissipation accelerating means being responsive to the back EMF and serving to further increase the variable impedance and having a positive feedback effect, the further increase in the variable impedance consequently increasing the back EMF and the rate of dissipation, the dissipation accelerating means continuously operable until the quantity of stored magnetic energy is substantially reduced to zero.

9. The energy discharge apparatus as claimed in claim 8, wherein the variable impedance control means includes a digital signal processing control means comprising an analog to digital converter, a processor, a memory, a digital to analog converter and a control algorithm, the analog to digital converter being operable to sample the voltage signal, the digital to analog converter providing a control signal serving to control the variable impedance.

10. The energy discharge apparatus as claimed in claim 8, wherein the dissipation accelerating means includes a digital signal processing control means comprising an analog to digital converter, a processor, a memory, a digital to analog converter and a control algorithm, the analog to digital converter operable to sample the back EMF, the digital to analog converter providing a control signal serving to control the variable impedance.

11. The energy discharge apparatus as claimed in claim 1, wherein the variable impedance has a first device terminal, a second device terminal and a third device terminal, and the generator field coil has a first coil terminal and a second coil terminal, the second device terminal of the variable impedance being connected to the first coil terminal of the generator field coil, a first voltage signal being between the second coil terminal and the third device terminal, a second voltage signal being between the second and the third device terminals and a third voltage signal being between the first and the third device terminals of the variable impedance, the first control circuit being connected to the first device terminal, the third device terminal and the second coil terminal, the first control circuit being responsive to the first voltage signal and being operable to adjust the third voltage signal, the third voltage signal being operable to adjust an impedance between the second and the third device terminals.

12. The energy discharge apparatus as claimed in claim 11, wherein the second control circuit includes a transistor, a first resistor and a second resistor, the transistor having a first transistor terminal, a second transistor terminal and a third transistor terminal, the second transistor terminal being connected to the first device terminal, the third transistor terminal being connected to the third device terminal, the first resistor being connected between the third device terminal and the first transistor terminal, the second resistor being connected between the first transistor terminal and the second device terminal.

13. The energy discharge apparatus as claimed in claim 12, wherein the transistor is a MOSFET transistor having a gate, a drain and a source, the gate being the first transistor terminal, the drain being the second transistor terminal and the source being the third transistor terminal.

14. The energy discharge apparatus as claimed in claim 12, wherein the transistor is a bipolar transistor having a base, a collector and an emitter, the base being the first transistor terminal, the collector being the second transistor terminal and the emitter being the third transistor terminal.

15. The energy discharge apparatus as claimed in claim 1, further including:
- a stator;
- a rotor; and
- a generator armature coil, the generator field coil providing a generator field magnetic field, the generator armature coil being responsive to the generator field magnetic field and providing a generator armature signal, the generator field coil being on the rotor and the generator armature coil being on the stator;
- wherein the exciter field coil is on the stator; the exciter armature coil is on the rotor, and the first control circuit and the variable impedance are on the rotor.

16. The energy discharge apparatus as claimed in claim 15, further including a positive feedback circuit responsive to the exciter armature signal and operable to dissipate a quantity of stored magnetic energy, the positive feedback circuit being further responsive to the dissipation of the quantity of stored magnetic energy such that a rate of dissipation increases until the quantity of stored magnetic energy substantially reduces to an insubstantial amount, the positive feedback circuit being on the rotor.

* * * * *